United States Patent
Knecht et al.

(10) Patent No.: US 7,069,800 B2
(45) Date of Patent: Jul. 4, 2006

(54) COUPLING DEVICE AND A METHOD FOR COUPLING

(75) Inventors: Emil Knecht, Strängnäs (SE); Håkan Johansson, Eskilstuna (SE); Johan Mohlin, Vinninga (SE); Karin Eriksson, Kumla (SE)

(73) Assignee: Volvo Construction Equipment Components AB, Eskilstuna (SE)

( * ) Notice: Subject to any disclaimer, the term of this patent is extended or adjusted under 35 U.S.C. 154(b) by 0 days.

(21) Appl. No.: 10/249,035

(22) Filed: Mar. 11, 2003

(65) Prior Publication Data

US 2003/0164278 A1 Sep. 4, 2003

Related U.S. Application Data

(63) Continuation of application No. PCT/SE01/01938, filed on Sep. 11, 2001.

(30) Foreign Application Priority Data

Sep. 11, 2000 (SE) .................................... 0003220

(51) Int. Cl.
F16H 59/00 (2006.01)
F16H 61/26 (2006.01)

(52) U.S. Cl. ........................................ 74/335; 477/127

(58) Field of Classification Search .............. 92/13.6, 92/85 R, 181 R, 255; 74/335; 477/104, 477/110, 115, 116, 127, 128
See application file for complete search history.

(56) References Cited

U.S. PATENT DOCUMENTS

| | | | |
|---|---|---|---|
| 3,834,499 A | | 9/1974 | Candellero et al. |
| 4,754,665 A | * | 7/1988 | Vandervoort ................ 74/745 |
| 4,802,384 A | | 2/1989 | Schwarz et al. |
| 4,817,470 A | * | 4/1989 | Muller et al. ................ 477/110 |
| 5,167,311 A | * | 12/1992 | Satoh et al. ................... 192/73 |
| 5,191,825 A | | 3/1993 | Beneteau et al. |
| 5,411,450 A | | 5/1995 | Gratton et al. |
| 5,416,698 A | | 5/1995 | Hutchison |
| 5,487,004 A | * | 1/1996 | Amsallen ...................... 701/51 |
| 5,528,949 A | * | 6/1996 | Stainton et al. ................ 74/335 |
| 5,743,143 A | * | 4/1998 | Carpenter et al. ............ 74/335 |
| 5,850,760 A | * | 12/1998 | Jin et al. .................. 74/473.11 |
| 5,961,420 A | * | 10/1999 | Darnell ....................... 477/120 |

(Continued)

FOREIGN PATENT DOCUMENTS

DE 922211 C 1/1955

(Continued)

*Primary Examiner*—Roger Pang
(74) *Attorney, Agent, or Firm*—Novak Druce & Quigg, LLP

(57) ABSTRACT

Method and apparatus for positioning a coupling means in a gearbox in a first gear position, a second gear position and an intermediate neutral position. The apparatus includes a housing (5) that forms a working cylinder (6), a main piston (7) arranged in the working cylinder (6) in order to interact operationally therewith, and a piston rod (8) connected rigidly to the main piston and extending from a first side thereof out of the housing (5). The piston rod (8) is connected to the coupling means or mechanism (4) outside the housing. The main piston (7) is arranged displaceably between three different positions in the working cylinder that correspond to the first and second gear positions, and the neutral position. An auxiliary piston (11) is also arranged displaceably inside the housing. The auxiliary piston (11) is adapted to operationally interact with the working cylinder and is arranged on a second, opposite side of the main piston relative to the first side.

7 Claims, 7 Drawing Sheets

U.S. PATENT DOCUMENTS 5,970,810 A * 10/1999 Wadas .......................... 74/335
5,974,906 A * 11/1999 Stine et al. .................... 74/335
6,000,294 A * 12/1999 Jackson et al. ............... 74/335
6,080,081 A *  6/2000 Sauermann et al. .......... 477/79
6,095,003 A *  8/2000 Genise ......................... 74/335
6,327,529 B1 * 12/2001 Ore .............................. 701/55
6,461,272 B1 * 10/2002 Boardman et al. ............ 477/91
6,461,274 B1 * 10/2002 Genise et al. ............... 477/109

FOREIGN PATENT DOCUMENTS

| GB | 888036 A | 1/1962 |
| GB | 1216546 A | 12/1970 |

* cited by examiner

Utilizing a device in the execution of the method and which is configured for positioning a coupling mechanism in a gearbox in a first gear position, a second gear position and an intermediate neutral position, the device including: a housing which forms a working cylinder; a main piston arranged in the working cylinder for reciprocating operation therein; a piston rod rigidly connected to the main piston and extending from a first side of the main piston out of the housing where the piston rod is connected to a coupling mechanism, the main piston being arranged displaceably between three different positions in the working cylinder and which correspond to first and second gear positions, and a neutral position; an auxiliary piston displaceably arranged inside the housing and being adapted to operationally interact with the working cylinder, the auxiliary piston being arranged on a second side of the main piston opposite to the first side thereof; and sensors adapted for detecting the position of the coupling mechanism .

↓ ↓

The gearbox being a transfer gearbox that is operationally connected to a main gearbox.

The device being configured for incorporation upon a construction machine of a type including dumpers and wheel loaders.

© ↓

The speed control is effected by downshifting in a main gearbox connected to the gearbox.

A speed of an output shaft from the gearbox is measured, load to the input shaft of the gearbox is disengaged at a predetermined speed, and the shifting operation is then performed.

Fig. 9

COUPLING DEVICE AND A METHOD FOR COUPLING

CROSS REFERENCE TO RELATED APPLICATIONS

This application is a continuation patent application of International Application No. PCT/SE01/01938 filed 11 Sep. 2001 which was published in English pursuant to Article 21 (2) of the Patent Cooperation Treaty and which claims priority to Swedish Patent Application No. 0003220-1 filed 11 Sep. 2000. Both applications are expressly incorporated herein by reference in their entireties.

BACKGROUND OF INVENTION

1. Field of the Invention

The present invention relates to a device for positioning a coupling means in a gearbox in a first gear position, a second gear position and an intermediate neutral position. The invention also relates to a method for such positioning of a coupling means in a gearbox.

The invention is described hereinbelow configured so that the gearbox includes a dropbox or transfer gearbox that is operationally connected to a main gearbox. Such an arrangement with a main gearbox and a transfer gearbox is found in a construction machine such as a dumper or wheel loader. The purpose of the transfer gearbox is to allow shifting between a low-gear register (low) and a high-gear register (high), and also to distribute the force between a front axle and a rear axle of the vehicle. It should be appreciated, however, that this is a preferred, but in no way limiting, application of the invention.

Using conventional technology, shifting between low and high can be performed only when the vehicle is standing still. It is desirable for it to be possible to perform such shifting while driving (traveling) and thereby obtaining shorter operating cycle times.

2. Background Art

U.S. Pat. No. 4,593,606 describes a piston/cylinder device for bringing about shifting action in a gearbox. A main piston is enclosed in a first working cylinder of a housing and connected to a piston rod. The piston rod is in turn connected to a coupling means for the purpose of bringing about such shifting. A rear portion projecting from the main piston forms a second working cylinder, in which an auxiliary piston is displaceably arranged. A first pressure chamber is formed between the main piston and a first end of the first working cylinder. A pressure chamber is formed between the mutually facing surfaces of the main piston and the auxiliary piston. A pipe for compressed air leads to the second pressure chamber through the auxiliary piston. A third pressure chamber is formed between the auxiliary piston and a second end of the first working cylinder.

Devices that are equipped with such a piston/cylinder device are relatively complicated with two working cylinders. Furthermore, a relatively complicated control of the supply of compressed air is required in order to achieve the three positions.

SUMMARY OF INVENTION

One object of the invention is to produce a device for positioning a coupling means in a gearbox that affords opportunities for manufacture that are more cost-effective in relation to the prior art. Another object is to produce a device that affords opportunities for rapid and reliable movement of the main piston between the several positions. A further object is to produce a device that occupies a smaller space in relation to previously known piston/cylinder devices.

The above objects are achieved, at least in part, by virtue of the fact that the auxiliary piston is adapted to interact operationally with the working cylinder and is arranged on a second, opposite side of the main piston relative to said first side. The expression that the piston is adapted to interact operationally with the cylinder means that the piston delimits two spaces in the working cylinder and that the piston is movable relative to the working cylinder by virtue of forces of different magnitude being applied to the opposite surfaces of the piston. In other words, the piston is arranged in such a manner in the working cylinder that a radial outer surface of the piston is located next to, or at a small distance from an inner lateral surface of the working cylinder so as to be moved along the same.

According to a preferred embodiment of the invention, the device includes a first duct for pressure medium through the housing and into a space between the main piston and the auxiliary piston for moving the main piston relative to the auxiliary piston. A second duct is provided through the housing to a space on the first side of the main piston. The surface of the main piston is accessible to the pressure medium and is larger on the second side than on the first side. As a result, the main piston can, for example, be made to stop in the neutral position when shifting from low to high by virtue of the pressure medium (compressed air) being applied at the same pressure on both sides of the main piston.

According to another preferred embodiment of the invention, the device includes a regulating arrangement that includes a pump and three valves connected to the pump and which each control air to, or as the case may be, from one of said first, second and third ducts. The device preferably comprises (includes) an electric control unit that is electrically connected to the valves for regulating opening, or as the case may be, closing of the valves.

A further object of the invention is to provide a method for positioning a coupling means in a gearbox that allows rapid and reliable movement of the main piston between the different positions. Yet another aim is to provide a method that affords opportunities for a device for this positioning which can be cost-effectively produced.

Further advantageous embodiments and advantages of the invention emerge from the description below and the associated patent claims.

BRIEF DESCRIPTION OF DRAWINGS

The invention will be described in greater detail below with reference to the embodiment shown in the accompanying drawings, in which:

FIGS. 5–9 are representative flow charts illustrating and exemplifying method embodiments of the present invention.

DETAILED DESCRIPTION

Figure 1:
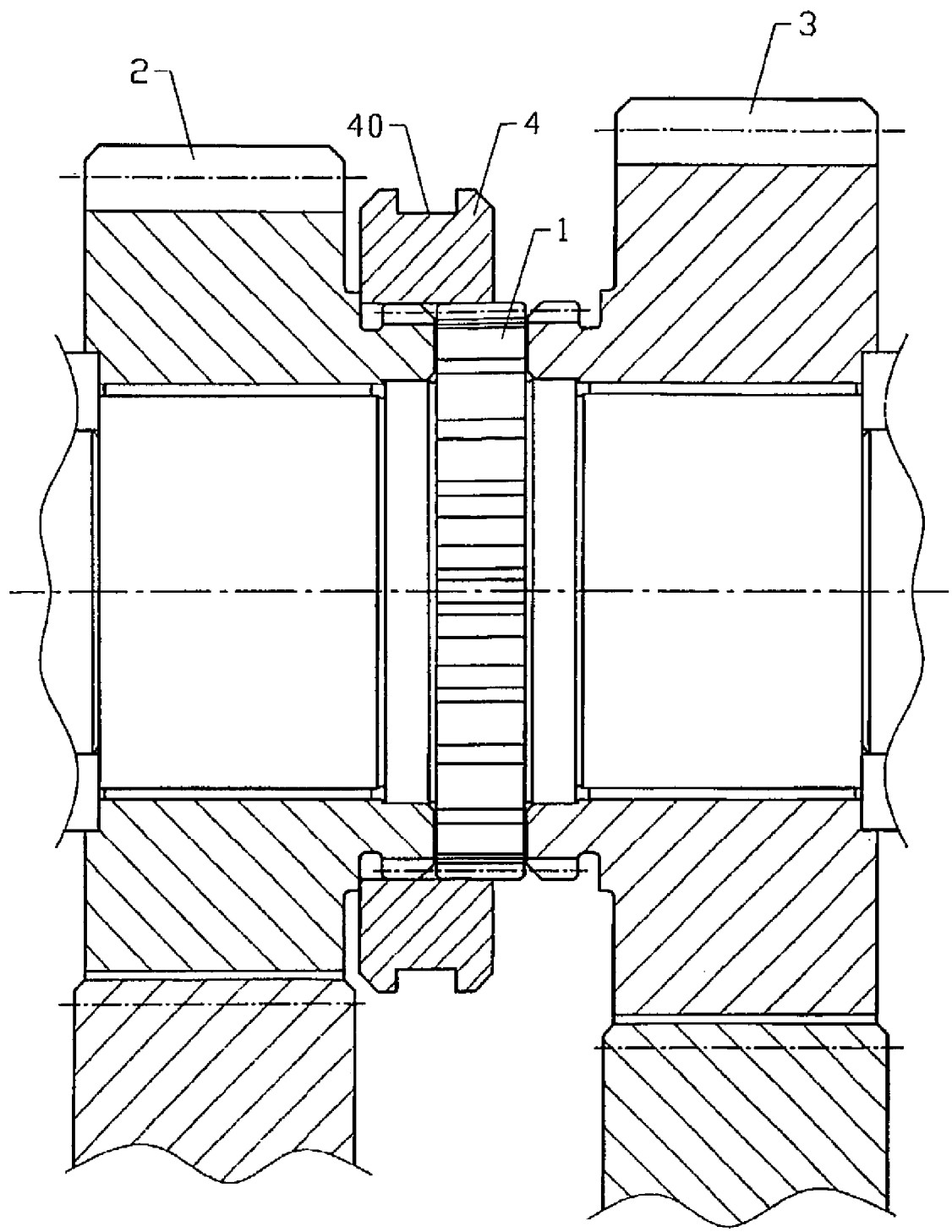
FIG. 1 is a cut-away cross-sectional view of a coupling means in a gearbox that is intended to be moved by means of a device configured according to the present invention.

FIG. 1 illustrates an input shaft 1 in a dropbox, or transfer gearbox, of a construction machine. The transfer gearbox is operationally connected to a main gearbox via the input shaft 1. A first and a second gearwheel 2, 3 are mounted by roller bearings on the shaft 1. A coupling means 4 is arranged in a first position, in which it is in engagement with the first gear wheel 2. This corresponds to a first gear position in the gearbox. By moving the coupling means 4 to the right in FIG. 1, an intermediate neutral position is first obtained, and then a second position, in which it is in engagement with the second gear wheel 3 is obtained. This second position corresponds to a second gear position in the gearbox.

In this exemplary embodiment, the coupling means 4 takes the form of a slidable coupling sleeve 4. The coupling sleeve 4 is connected to the shaft 1 via a spline joint and can be displaced in the axial direction by means of an arm 10 as depicted in FIG. 2.

Figure 2:
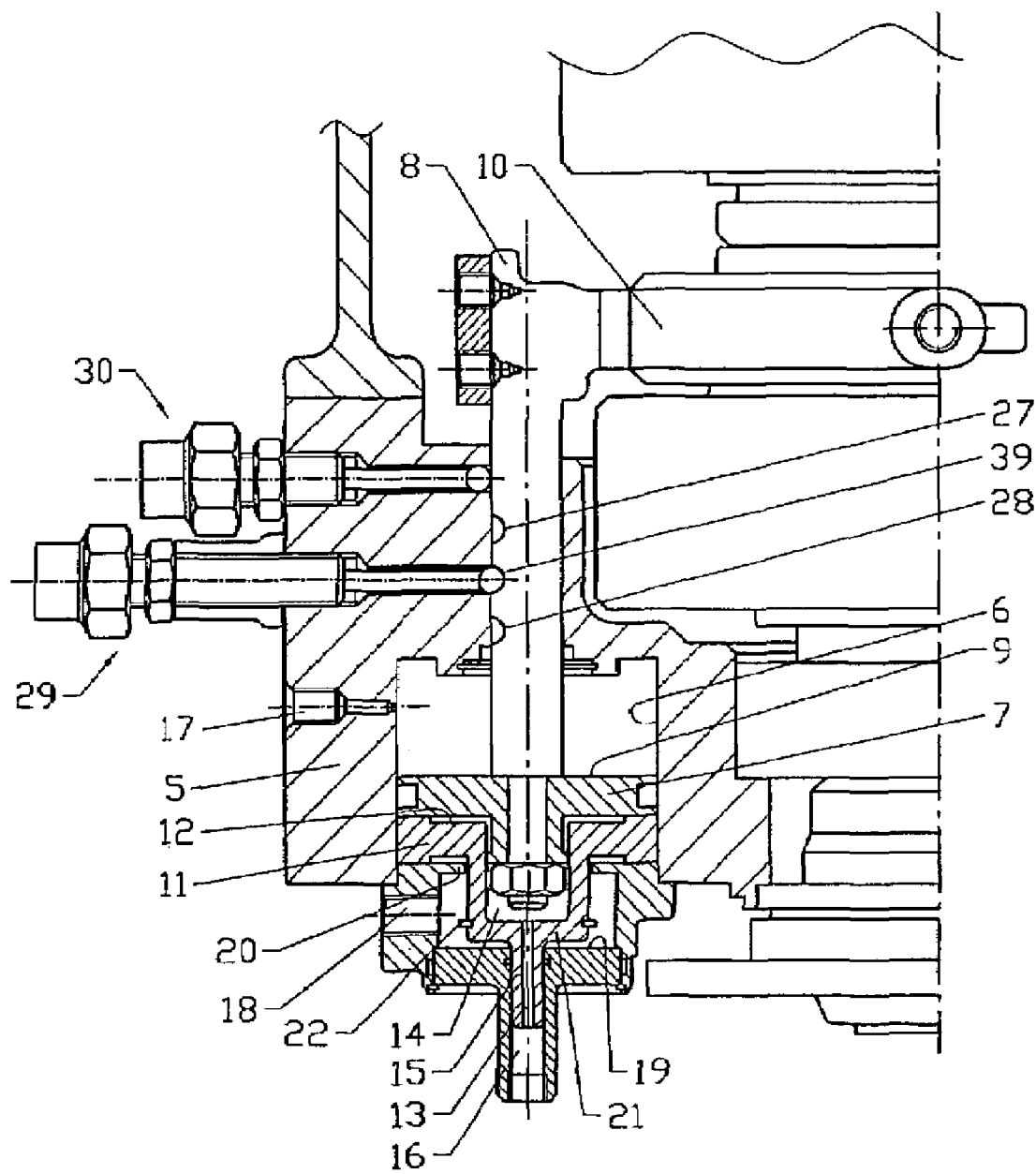
FIG. 2 is a cross-sectional view of a controlled device configured according to a preferred embodiment of the present invention.

FIG. 2 illustrates a piston/cylinder device that is operationally connected to the coupling means 4 for the purpose of moving it. The device comprises (includes) a housing 5 that forms a working cylinder 6 for a main piston 7. A piston rod 8 is connected rigidly to the main piston 7 and extends from a first side 9 of the piston 7 and out of the housing 5. Outside the housing 5, the piston rod 8 is connected to the coupling-means 4 via the arm 10. Exemplarily, the arm 10 can have a fork that is arranged in engagement with a recess 40 in the coupling sleeve 4.

The main piston 7 is arranged displaceably between three different positions in the working cylinder 6 that correspond to first, second and neutral gear positions. An auxiliary piston 11 is adapted to interact operationally with the working cylinder 6 and is arranged on a second, opposite side 12 of the main piston relative to a first side 9.

The device comprises a first duct 13 for pressure medium through the housing and into a space 14 between the main piston 7 and the auxiliary piston 11 for moving the main piston relative to the auxiliary piston. The first duct 13 extends through the auxiliary piston 11 in its intended direction of movement and opens in a surface of the auxiliary piston that faces the main piston.

The auxiliary piston 11 comprises a portion 15 which projects from a side of that same opposite side of the auxiliary piston which faces the main piston 6. The projecting portion 15 comprises the first duct 13. The housing 5 comprises an opening 16, in which the projecting portion 15 is movably arranged. The movement path of the auxiliary piston 11 is limited in both a forward and a backward direction by portions 19, 20 of the housing 5. In the returned position of the auxiliary piston shown in FIG. 1, a portion 21 of the auxiliary piston bears against an inner delimiting surface 19 of the working cylinder 6. The auxiliary piston has a portion 22 which projects transversely to its direction of movement and is intended, when the auxiliary cylinder is arranged in its advanced position, to bear against a portion 20 of the housing 5 projecting into the working cylinder.

The device also includes a second duct 17 passing through the housing 5 to a space on the first side 9 of the main piston 7. A third duct 18 is provided through the housing 5 and which leads to a space on a side of the auxiliary piston 11 opposite the main piston 7. The second duct 17 has, at least in part, a smaller cross section than the third opening. The functioning of such a constriction is explained below.

The piston rod 8 is provided with three recesses 27, 28, 39. Two sensors 29, 30 are arranged for detecting the position of the piston rod by means of the recesses 27, 28, 39.

Figure 3:
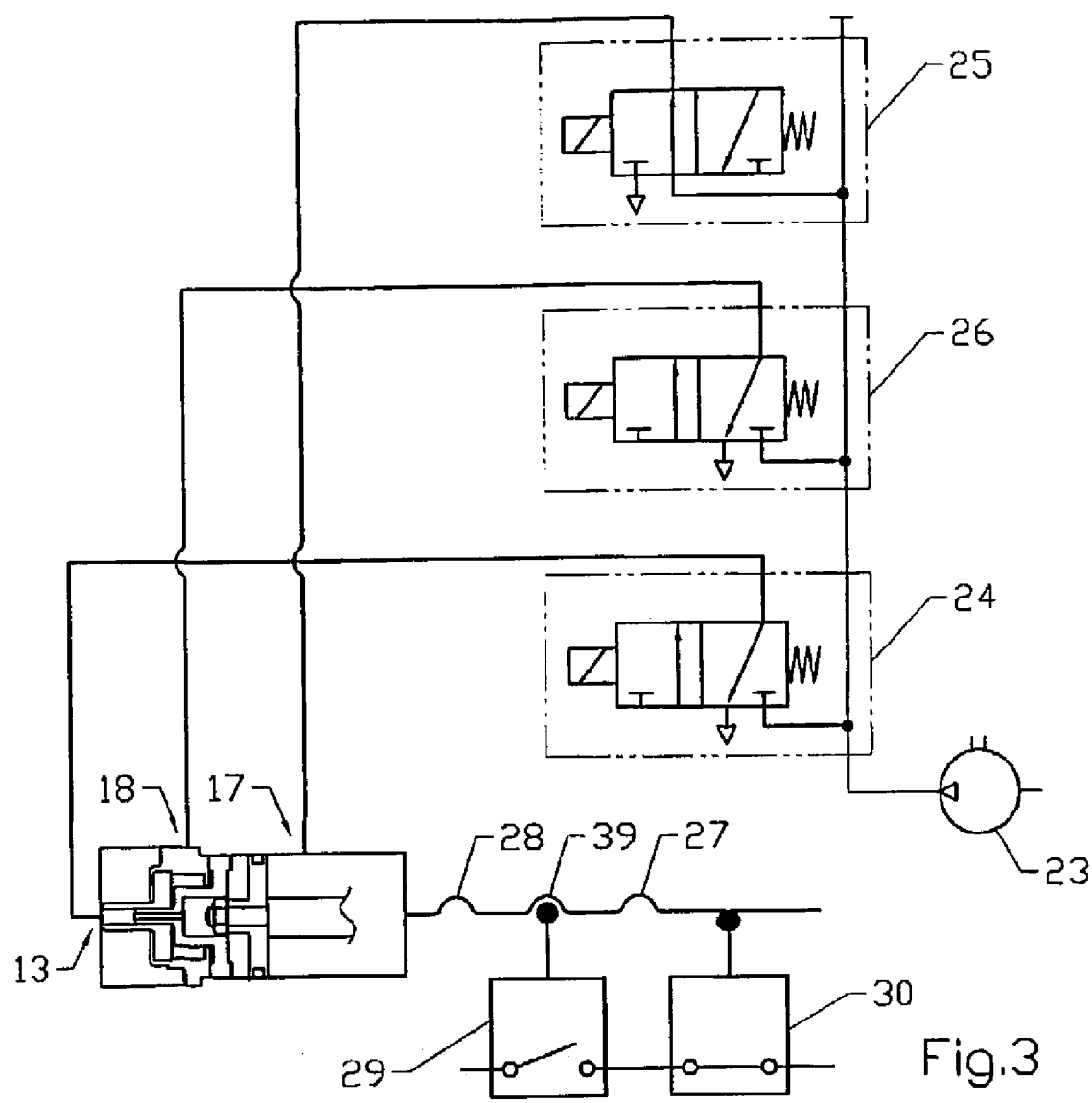
FIG. 3 is a diagram illustrating a regulating arrangement included in the positioning device.

FIG. 3 illustrates an arrangement for regulating the supply, or as the case may be, the removal of pressure medium, exemplarily in the form of compressed air, to and from the working cylinder 6 for the purpose of moving the main piston 7 between the three positions. The regulating arrangement comprises a pump 23 and three valves 24 that each control air to (or from) the first 13, second 17 and third 18 ducts, respectively. The valves establish what are commonly known as on/off valves.

The shifting procedure will now be described in detail. Shifting from low to high is initiated when the vehicle has reached a predetermined speed, for example 36 km/h. The speed is sensed via a detector in a conventional manner. The supply of gas to the engine, as well as the load (torque) on the transfer gearbox, is disconnected. The latter is brought about by the transfer gearbox being freed by brief disengagement of a coupling in the main gearbox. The brief disengagement can extend over, for example, 0.2–0.3 seconds.

The coupling means 4 is now transferred into the neutral position. This is brought about by turning on the third valve 26. Compressed air is then supplied through the third duct 18. The auxiliary piston 11 and the main piston 7 are thus moved forward together until the projecting portion 22 of the auxiliary piston is stopped by the housing part 20. The second duct 17 has such a constriction that a sufficient quantity of air is present in the space on an opposite side of the main piston relative to the auxiliary piston 11 in order to apply a certain counter-pressure to the main piston 7.

The position of the piston rod 8 is detected by means of the sensors 29, 30. When both the sensors 29, 30 sense the grooves 27, 28 in the piston rod 8, the coupling means 4 has reached the neutral position. The second valve 25 is now made to turn on. Compressed air is thus supplied through the second duct 17. By turning on the second valve 25 when the neutral position of the coupling means has been detected, the main piston can be stopped rapidly and effectively owing to difference in area of the piston surfaces. The main piston 7 is thus made to stop in the neutral position.

In order for it to be possible to bring about a rapid shifting operation, rapid synchronization of the speeds of the input shaft 1 and the output shaft (not shown) in the transfer gearbox is necessary. According to the invention, this is brought about by decelerating a retarder (torque converter) connected to the main gearbox. According to an alternative or supplementary arrangement, use is made of a multiple disk brake included in the main gearbox. According to a further alternative or supplementary arrangement, downshifting is performed in the main gearbox.

The speeds of the input and output shafts are sensed and, when they at least essentially correspond to one another, the coupling means is transferred from the neutral position into engagement with the second gear wheel 3. This is brought about by the turning on of the first valve 24 causing compressed air to be supplied through the first duct 13. The main piston 7 is then moved into its end position bearing against an inner end surface of the working cylinder 6. This is detected by the sensor 30 sensing the intermediate groove 39 in the piston rod 8. The torque to the transfer gearbox and the application of gas to the engine are subsequently connected back in.

Shifting from high to low is initiated when the vehicle has been decelerated from a higher speed to a predetermined lower speed, for example 36 km/h. The application of gas to the engine and load (the torque) upon the transfer gearbox are disconnected in the same way as described above. The coupling means 4 is moved into the neutral position by virtue of the main piston 7 being moved into its intermediate position. The latter is brought about by turning on the second valve 25. Compressed air is then supplied to the second duct 17. The still pressurized auxiliary piston 11 stops the movement of the main piston 7 in the neutral position. The neutral position is detected by the sensors 29, 30 sensing the grooves 27, 28.

Synchronization of the speeds of the input shaft 1 and the output shaft (not shown) in the transfer gearbox is effected by accelerating the input shaft. This is brought about via electronic injection of fuel into the engine. As an alternative or supplementary arrangement, upshifting is performed in the main gearbox.

The speeds of the input and output shafts are sensed and, when they at least essentially or substantially correspond to one another, the coupling means 4 is transferred from the neutral position into engagement with the first gear wheel 2. This is brought about by turning off the third valve 26. The main piston 7 is then moved into its other end position. This is detected by the sensor 29 sensing the intermediate groove 39 in the piston rod 8. The torque to the transfer gearbox and the application of gas to the engine are subsequently connected back in.

The table below indicates the positions of the valves 24, 25, 26 and the sensors 29, 30 in low gear, neutral position and high gear.

|  | Low gear | Neutral position | High gear |
|---|---|---|---|
| Solenoid valve low gear (25) | 1 | 0 | 0 |
| Solenoid valve neutral position (26) | 0 | 1 | 0 |
| Solenoid valve high gear (24) | 0 | 0 | 1 |
| Sensor high gear (30) | 0 | 1 | 1 |
| Sensor low gear (29) | 1 | 1 | 0 |

In high gear, the solenoid valve 26 can also be turned on (1).

Figure 4:
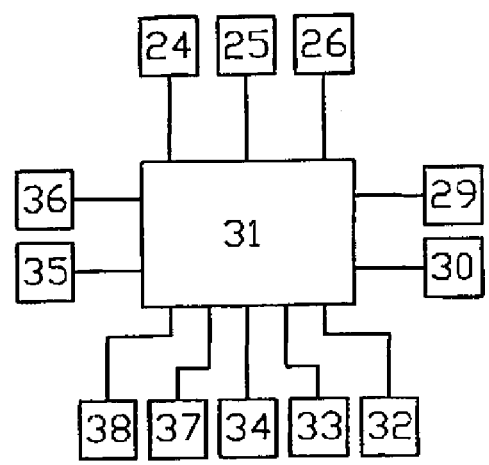
FIG. 4 is a schematic block diagram demonstrating a device for controlling the movements of an exemplary coupling means.
Figure 5:
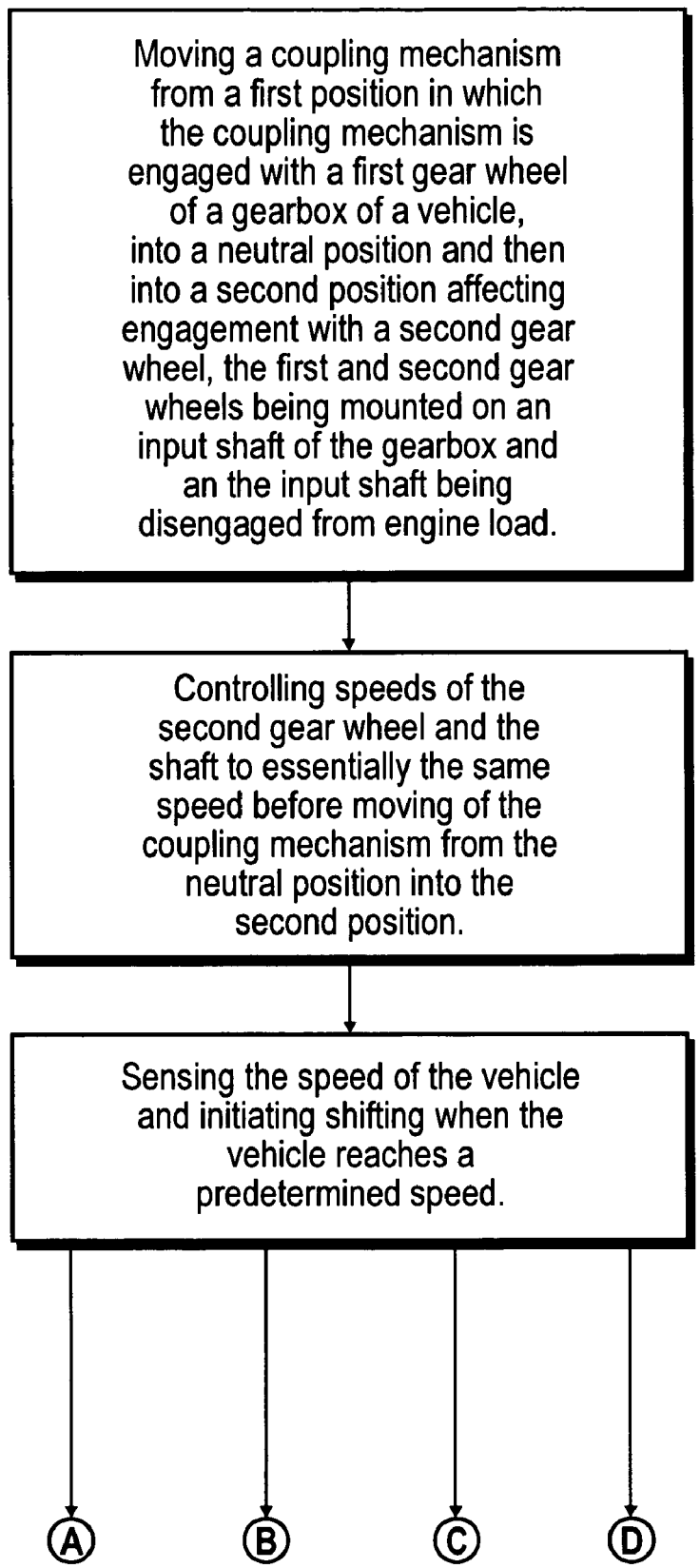
Figure 6:
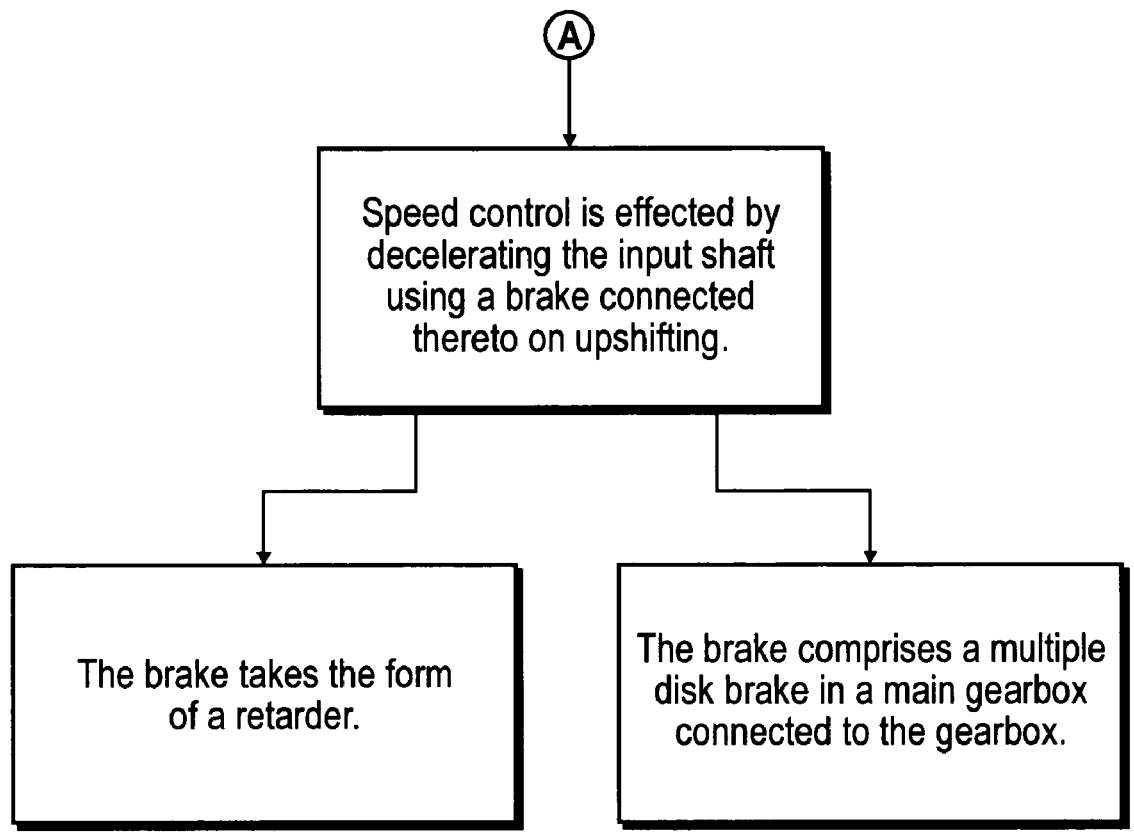

FIG. 4 illustrates, via a block diagram, a device for controlling the movements of the coupling means or mechanism according to the shifting operations described above. An electric control unit 31 is coupled to the sensors 29, 30, the solenoid valves 24, 25, 26, a detector 32 for sensing the speed of the vehicle, a valve 33 for disconnecting the accelerator of the vehicle, the coupling 34 in the main gearbox, the retarder 35, an arrangement 36 for regulating the fuel supply to the engine, and detectors 37, 38 for sensing the speed of the input shaft 1 and output shaft.

It should be understood that the movement path of the auxiliary piston is limited in both a forward and a backward direction by portions of the housing, typically in the form of parts that are connected to the housing.

The neutral position referred to above can comprise a number of positions.

The invention is not to be considered as being limited to the illustrative embodiment(s) described herein, but a number of further variants and modifications are possible within the scope of the patent claims below.

The invention claimed is:

1. A method for changing gears of a vehicle transmission comprising the steps of:
providing a gear changer assembly comprising:
a housing including an outer wall and having a cylindrical cavity formed therein;
a first piston mounted for reciprocal movement in said cylindrical cavity said first piston having a piston rod connected to slide out of said housing to provide a rod end extending therefrom;
a gear selector connected to said rod end of said piston rod;
an auxiliary piston inside said cylindrical cavity for reciprocal movement, said auxiliary piston including a projecting portion extending from said housing opposite said piston rod;
a first duct through said housing into said cylindrical cavity;
a second duct through said housing into an annular cavity formed around said auxiliary piston in said cylindrical cavity;
a third duct, open at both ends and extending through said projecting portion of said auxiliary piston;
a first sensor held in said housing for contact with said piston rod to detect a first position thereof; and
a second sensor held in said housing for contact with said piston rod for detecting a second position thereof and further detecting a third position of said piston rod when said first sensor detects said first position, said piston rod moving between said first, said second and said third positions to move said gear selector for selection of a first gear wheel, a neutral position and a second gear wheel;
placing said gear selector in the neutral position of the vehicle transmission by applying pressure through said second duct to move said piston rod for detection of said first position by said first sensor and detection of said third position by said second sensor;
engaging the first gear wheel of the vehicle transmission by applying pressure through said first duct for moving said piston rod for detection of said second position by said second sensor; and
changing the vehicle transmission between said first gear wheel and said second gear wheel by applying pressure through said third duct for moving said piston rod for detection of said second position by said first sensor, wherein said gear selector engages said second gear wheel.

2. The method of claim 1, wherein said applying pressure uses a pressure medium selected from the group consisting of compressed air and fluid media.

3. The method as recited in claim 1, wherein movement of said auxiliary piston is limited in both a forward and a backward direction by portions of the housing.

4. The method as recited in claim 1, wherein said gear change assembly is a transfer gearbox that is operationally connected to a main gearbox.

5. The method as recited in claim 1, wherein said gear change assembly is configured for incorporation upon a construction machine selected from dumpers and wheel loaders.

6. A method for changing gears of a vehicle transmission comprising the steps of:
providing a gear changer assembly comprising:
a housing including an outer wall and having a cylindrical cavity formed therein to provide a first outlet opposite a second outlet, said housing further including a first channel and a second channel each opening to said first outlet and said outer wall;

a first piston mounted for reciprocal movement in said cylindrical cavity said first piston having a first surface facing said first outlet and a second surface opposite said first surface;

a piston rod connected to said first piston and located to slide in said first outlet to provide a rod end extending outwards from said first outlet;

a gear selector arm connected to said rod end of said piston rod to move a gear selector;

an auxiliary piston inside said cylindrical cavity for reciprocal movement between said second surface of said first piston and said second outlet, said auxiliary piston including a first face, a second face, and a projecting portion mounted in said second outlet for movement with said auxiliary piston;

a first duct, opening from said outer wall of said housing into said cylindrical cavity between said first surface of said first piston and said first outlet;

a second duct opening from said outer wall of said housing into an annular cavity formed around said auxiliary piston in said cylindrical cavity between said second face and said second outlet;

a third duct, open at both ends and extending through said projecting portion of said auxiliary piston;

a first sensor held in said first channel for contact with said piston rod to detect a first recess formed therein; and a second sensor held in said second channel for contact with said piston rod for detecting a second recess formed in said piston rod and further detecting a third recess therein when said first sensor detects said first recess, said first, said second and said third recesses moving with said piston rod during movement of said gear selector by said gear selector arm between a first gear wheel, a neutral position and a second gear wheel;

moving said gear selector arm to place said gear selector in the neutral position of the vehicle transmission by applying pressure through said second duct against said second face to move said auxiliary piston and said first piston to position said piston rod for detection of said first recess by said first sensor and detection of said third recess by said second sensor;

engaging the first gear wheel of the vehicle transmission by introducing pressure through said first duct for moving said first piston to separate said first surface from said first outlet to position said piston rod for detection of said second recess by said second sensor, wherein said gear selector arm moves said gear selector to engage said first gear wheel; and changing the vehicle transmission between said first gear wheel and said second gear wheel by applying pressure through said third duct for moving said first piston to separate said second surface from said first face to position said piston rod for detection of said second recess by said first sensor, wherein said gear selector arm moves said gear selector to engage said second gear wheel.

7. A gear changer assembly comprising:

a housing including an outer wall and having a cylindrical cavity formed therein to provide a first outlet opposite a second outlet, said housing further including a first channel and a second channel each opening to said first outlet and said outer wall;

a first piston mounted for reciprocal movement in said cylindrical cavity said first piston having a first surface facing said first outlet and a second surface opposite said first surface;

a piston rod connected to said first piston and located to slide in said first outlet to provide a rod end extending outwards from said first outlet;

a gear selector arm connected to said rod end of said piston rod to move a gear selector;

an auxiliary piston inside said cylindrical cavity for reciprocal movement between said second surface of said first piston and said second outlet, said auxiliary piston including a first face, a second face, and a projecting portion mounted in said second outlet for movement with said auxiliary piston;

a first duct, opening from said outer wall of said housing into said cylindrical cavity between said first surface of said first piston and said first outlet;

a second duct opening from said outer wall of said housing into an annular cavity formed around said auxiliary piston in said cylindrical cavity between said second face and said second outlet;

a third duct, open at both ends and extending through said projecting portion of said auxiliary piston;

a first sensor held in said first channel for contact with said piston rod to detect a first recess formed therein; and a second sensor held in said second channel for contact with said piston rod for detecting a second recess formed therein, said first sensor detecting said first recess when said second sensor detects said second recess, said first sensor further situated to detect a third recess in said piston rod, said first, said second and said third recesses moving with said piston rod during movement of said gear selector by said gear selector arm between a first gear, a neutral position and a second gear.

* * * * *